_United States Patent Office_  
3,084,025  
Patented Apr. 2, 1963

3,084,025  
PROCESS FOR PREPARING CHLORODI-FLUOROAMINE  
David M. Gardner, North Wales, and Edward S. Eitelman, Oreland, Pa., assignors to Pennsalt Chemicals Corporation, Philadelphia, Pa., a corporation of Pennsylvania  
No Drawing. Filed May 27, 1960, Ser. No. 32,094  
7 Claims. (Cl. 23—14)

This invention relates to a novel process for the preparation of chlorodifluoroamine ($NF_2Cl$). More particularly, this invention deals with the preparation of chlorodifluoroamine by reaction of chlorine trifluoride with an ammonium fluoride.

Chlorodifluoroamine is a colorless gas valuable as an intermediate to high energy compounds containing nitrogen and fluorine. For example, when chlorodifluoroamine is reacted at room temperature with excess mercury, tetrafluorohydrazine is obtained in good yield.

Heretofore, chlorodifluoroamine has been prepared with difficulty from difluoroamine which is difficult to obtain. For example, difluoroamine and boron trichloride are condensed in vacuo at $-130°$ C. and then warmed toward room temperature to obtain chlorodifluoroamine as one of the products (see J. Am. Chem. Soc., vol. 82, page 2400, May 5, 1960).

It has now been found that chlorodifluoroamine may be obtained readily and in good yield from relatively inexpensive commercially available materials. This is accomplished by means of the process of this invention which comprises reacting an ammonium fluoride with chlorine trifluoride at a reaction temperature above about $-40°$ C.

In a preferred technique, the reaction of $ClF_3$ with the ammonium fluoride is carried out by passing a gaseous mixture of $ClF_3$ and an inert gaseous diluent (e.g. nitrogen, argon, krypton, helium, etc.) over the ammonium fluoride, the reaction being conducted at ambient temperature. Usually, the reaction is initiated at room temperature and the temperature of the reactor reaches between about 60° and 100° C. during the reaction. Although ambient temperatures are preferred, lower temperatures and temperature controlling means may be used during the reaction, but temperatures below about $-40°$ C. cannot be used because the reaction does not then proceed. The amount of $ClF_3$ in the gas stream should be less than about 35% by volume because concentrations of $ClF_3$ above this causes the ammonium fluoride to burn and the heat liberated is so great the reaction may get out of control. It is also suspected that at $ClF_3$ concentrations above 35% a competitive reaction proceeds which does not yield the chlorodifluoroamine product. At dilutions of the $ClF_3$ below about 7% by volume the reaction proceeds at an impractically low rate and thus concentrations below this level will be avoided. It will be understood that because $ClF_3$ and water react violently, the reaction will be carried out under conditions as anhydrous as possible.

As the reaction proceeds, the solid ammonium fluoride becomes liquid and is eventually entirely consumed. The chlorodifluoroamine and the by-products produced are swept from the reaction zone by the gas stream, and the product is separated and collected. Usually, this is done simply by passing the exit gases through traps held at a temperature of about $-80°$ C. or below and the $NF_2Cl$ product is condensed at $-196°$ C. The by-product gases of HF and $Cl_2$ are trapped out and are discarded or recovered as desired. Small amounts of impurities formed during the reaction (e.g. $N_2O$, $ClO_3F$ and $N_2F_2$) may be removed, if desired, by low temperature distillations to fractionate the crude product.

In carrying out the above technique the equipment used will be inert to the reactants, products and by-products. Useful materials of construction will be those metals resistant to the effects of chlorine and HF (e.g. nickel, Monel, steel, etc.) and certain thermally stable inert plastics such as polymers of tetrafluoroethylene, chlorotrifluoroethylene, vinylidene fluoride, copolymers of tetrafluoroethylene and hexafluoropropene and the like. Other inert materials may also be used, of course, but siliceous materials (e.g. glass, quartz, etc.) are to be avoided because of the attack by HF or $ClF_3$ that will result.

Reaction techniques other than that described above may also be employed. For example, chlorine trifluoride may be passed over solid ammonium fluoride at low temperature ($-196°$ C.) to condense the $ClF_3$ on the solid. Then, the temperature is increased slowly and the $NF_2Cl$ which is evolved at $-40°$ C. and above is collected by trapping at low temperatures. In this technique, the rate of $NF_2Cl$ formation is reasonably fast at about $-25°$ to $-5°$ C., but in order to avoid explosions which sometimes occur at temperatures of $-5°$ to $0°$ C. and higher, it is preferred to work below about $-5°$ C., preferably at $-25°$ C.

The ammonium fluoride reactant used in this process may be either the neutral compound ($NH_4F$) or ammonium bifluoride ($NH_4F \cdot HF$). Using $NH_4F$ as the reactant, the chemical reaction that occurs is illustrated by the following equation:

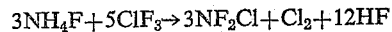

$$3NH_4F + 5ClF_3 \rightarrow 3NF_2Cl + Cl_2 + 12HF$$

The chlorine trifluoride reactant is readily prepared from chlorine and fluorine at 250° C. and condensing the product (FIAT—Review 23, 168 (1946), and is now commercially available.

In order to more fully describe and illustrate the invention the following examples are given:

*Example 1*

A copper boat was charged with 4 grams of ammonium fluoride and placed in a tube fabricated from polychlorotrifluoroethylene. A gaseous stream of chlorine trifluoride diluted with nitrogen to a 17% by volume concentration of $ClF_3$ was passed through the tube. The ammonium fluoride liquefied and was depleted as the reaction continued, being completely used up in about two hours. The temperature of the reaction tube increased from room temperature to about 60° C. as the exothermic reaction proceeded. The exit gases were passed through a trap held at $-196°$ C. from which the $NF_2Cl$ was tapped off. In this way a 100% conversion and 46% yield (based on $NH_4F$) of $NF_2Cl$ product was obtained. Based on the $ClF_3$ used the conversion was estimated at 63% and the yield was 70%.

When the above procedure was repeated with the chlorine trifluoride at volume concentrations of 44% and 38.5%, the ammonium fluoride flamed and the temperature rose above 100° C. very rapidly. At a chlorine trifluoride concentration of 37.7% a temperature of 100° C. was reached very quickly melting the reaction tube, but the ammonium fluoride did not fire.

When the procedure was repeated with a chlorine trifluoride concentration of 5% by volume, the process was imperceptibly slow.

*Example 2*

A gaseous stream of chlorine trifluoride was passed over solid ammonium fluoride held at $-196°$ C. to condense the $ClF_3$ on the ammonium fluoride. Then the solid was allowed to warm slowly and when about $-40°$ C. was reached, $NF_2Cl$ was evolved and collected in a trap held at $-196°$ C. The rate of $NF_2Cl$ evolution increased as the temperature rose until the temperature reached −5° C. at which point the reaction went out of control.

*Example 3*

Example 1 was repeated except that ammonium bifluoride was placed in the copper boat and the volume concentration of the chlorine trifluoride was adjusted to 9%. The reaction proceeded smoothly giving chlorodifluoroamine in good yield.

In lieu of using an ammonium fluoride as in the above examples, other ammonium halide salts may be used as for example ammonium chloride, ammonium bromide and also related ammonium halide salts such as hydroxylammonium fluoride, hydrazinium fluoride, and the like.

It will be understood by the skilled art worker that many variations and changes may be made from the above examples and description of the invention and accordingly such changes and variations are within the spirit and scope of the invention.

We claim:

1. A process for the preparation of chlorodifluoroamine which comprises reacting an initially solid ammonium fluoride and chlorine trifluoride at a temperature above about −40° C., said chlorine trifluoride being introduced into the reaction zone admixed with an inert gas diluent, the amount of said chlorine trifluoride comprising less than 35% by volume and the inert gas comprising the balance of the gaseous mixture.

2. A process for the preparation of chlorodifluoroamine which comprises reacting chlorine trifluoride with an ammonium fluoride by passing a gaseous mixture of chlorine trifluoride and an inert gas diluent selected from the group consisting of nitrogen, argon, krypton and helium over an initially solid ammonium fluoride, said gaseous mixture comprising less than 35% by volume of chlorine trifluoride and said reaction being conducted at a temperature between about −40° C. and ambient temperatures.

3. A process for the preparation of chlorodifluoroamine which comprises reacting $ClF_3$ and an ammonium fluoride by passing a gaseous mixture of $ClF_3$ and an inert gas diluent selected from the group consisting of nitrogen, argon, krypton and helium over an initially solid ammonium fluoride, said gaseous mixture comprising more than about 7% and less than about 35% by volume of $ClF_3$ the balance of said gaseous mixture being diluent and said reaction being conducted at ambient temperature.

4. A process for the preparation of chlorodifluoroamine which comprises reacting $ClF_3$ and an ammonium fluoride by passing a gaseous mixture of $ClF_3$ and nitrogen as a diluent over an initially solid ammonium fluoride, said gaseous mixture comprising more than 7% and less than about 35% by volume of $ClF_3$ the balance of said gaseous mixture being diluent and said reaction being conducted at a temperature between about −40° C. and about 100° C.

5. The process of claim 4 wherein the ammonium fluoride is $NH_4F$.

6. The process of claim 4 wherein the ammonium fluoride is ammonium bifluoride.

7. The process of claim 3 wherein the diluent is helium.

References Cited in the file of this patent

Sharpe et al.: Journal of the Chemical Society, London, 1948, pages 2135–2138.